UNITED STATES PATENT OFFICE.

CHRISTIAN SCHMID, OF PHILADELPHIA, PENNSYLVANIA.

RUST-PREVENTING COMPOSITION.

1,335,757.

Specification of Letters Patent.  Patented Apr. 6, 1920.

No Drawing.    Application filed September 23, 1919.  Serial No. 325,712.

*To all whom it may concern:*

Be it known that I, CHRISTIAN SCHMID, a citizen of the United States, and a resident of the city and county of Philadelphia, State of Pennsylvania, have invented certain new and useful Improvements in Rust-Preventing Compositions, of which the following is a specification.

My invention relates particularly to compositions for preventing rust and corrosion on metallic substances, and more particularly on surfaces of iron and steel, my improved composition being especially adapted for the prevention of rust and corrosion on fire arms, fine tools, instruments, and other articles formed of iron or steel and having finely finished surfaces.

A composition adapted for this purpose must be of such nature as to properly adhere to the surfaces under varying ranges of temperature and climatic conditions and yet be easily removable therefrom by wiping with a cloth or in any other convenient manner, while at the same time being effective to prevent rust and corrosion of the articles in connection with which it may be used without any deleterious or injurious action thereon.

I have discovered that a composition extremely effective for the purposes aforesaid may be produced from a suitable combination of beeswax, onions, an animal fat and turpentine with the addition, if desired, of a small quantity of some aromatic substance, such as oil of peppermint, to impart to the composition an agreeable odor.

While the specific proportions of the various ingredients may be varied somewhat in the preparation of the composition, I prefer to utilize the several ingredients in substantially the following amounts, by weight, in compounding, for example, a pound of the composition, namely, beeswax, five (5) ounces, onions, four (4) ounces, lard, clean and unsalted, five (5) ounces, turpentine, two (2) ounces, and a sufficient quantity of the aromatic ingredient, such as oil of peppermint, to impart the desired odor.

In preparing the composition, I preferably first cut the onions into small pieces and then boil them in the lard over a slow fire for a sufficient time to thoroughly cook, and to as great an extent as conveniently possible, dissolve the onions, which operation may require from twenty minutes to half an hour or longer, depending upon the amount of heat employed. In case the onions are not completely dissolved, the mixture may be preferably strained to remove the undissolved particles and thereafter allowed to cool. I next melt the beeswax, which should be clean and free from foreign substances, over a slow fire and add the turpentine thereto, thereafter removing the mixture from the fire and allowing it to cool. The two mixtures, namely, the lard and extract of onions, and the beeswax and turpentine, are then separately heated, and after a point of liquefaction is reached, are thoroughly mixed together and the desired quantity of the aromatic ingredient added. The mass is now allowed to cool, thereby forming a thick paste or ointment, in which condition it is ready for use, and may be suitably applied to form a thin coating on the surfaces which it is desired to protect from rust and corrosion.

I have found that the efficacy of the composition in preventing rust and corrosion apparently arises from the employment of the beeswax and onions, but as these substances cannot readily be combined by themselves in such a way as to form a stable composition, or one which will adhere to the surfaces to be protected, the employment of the turpentine for the purpose of softening the beeswax and the employment of the lard in the nature of a base or vehicle becomes necessary. I do not thereby desire or intend to limit myself solely to the use of these substances, namely, turpentine and lard, or either of them in the composition, as other materials adapted to act as solvents for the beeswax and as a base, carrier or vehicle material in the composition may be utilized if desired. Furthermore, while, as stated, I prefer in the preparation of the composition, to use the said materials in substantially the proportions given herein by way of example, I do not desire or intend to limit myself specifically to such proportions, or to the preferred method of preparing the composition which I have herein set forth, as the said proportions may be suitably varied and the several ingredients conveniently combined in different ways as desired without departing from the spirit and scope of the invention, as defined in the appended claims.

Having thus described my invention, I claim and desire to protect by Letters Patent of the United States:

1. A composition of matter comprising beeswax and an extract of onions.
2. A composition of matter comprising beeswax, an extract of onions and a substance forming a base or vehicle therefor.
3. A composition of matter comprising beeswax, an extract of onions, a substance forming a base or vehicle and a solvent for the beeswax.
4. A composition of matter comprising beeswax, an extract of onions and a fat.
5. A composition of matter comprising beeswax, an extract of onions, an animal fat and a solvent for the beeswax.
6. A composition of matter comprising beeswax, an extract of onions, lard and a solvent for the beeswax.
7. A composition of matter comprising beeswax, an extract of onions, an animal fat and turpentine.
8. A composition of matter comprising beeswax, an extract of onions, lard and turpentine.
9. A composition of matter comprising substantially five parts by weight of beeswax, five parts of a fat containing an extract of onions and two parts of turpentine.
10. A composition of matter comprising substantially five parts by weight of beeswax, five parts of an animal fat containing an extract of onions, two parts of turpentine and an aromatic substance.
11. A composition of matter comprising substantially five parts by weight of beeswax, five parts of lard containing an extract of onions, two parts of turpentine and a relatively small quantity of oil of peppermint.
12. A composition of matter comprising substantially five parts by weight of beeswax, two parts of turpentine, five parts of a fat and an extract derived from four parts of onions.

In witness whereof I have hereunto set my hand this 22nd day of September, 1919.

CHRISTIAN SCHMID.